US006166510A

United States Patent [19]

Higashi et al.

[11] Patent Number: 6,166,510

[45] Date of Patent: Dec. 26, 2000

[54] IMAGE FORMING APPARATUS

[75] Inventors: Toshikazu Higashi, Toyokawa; Tomonobu Tamura; Teruhiko Fujikura, both of Aichi-Ken; Akira Takasu, Toyokawa, all of Japan

[73] Assignee: Minolta Co., Ltd., Osaka, Japan

[21] Appl. No.: 09/210,983

[22] Filed: Dec. 14, 1998

[30] Foreign Application Priority Data

Dec. 26, 1997 [JP] Japan .................................... 9-360106

[51] Int. Cl.$^{7}$ ...................................................... H02K 37/00

[52] U.S. Cl. ........................... 318/685; 318/696; 399/167

[58] Field of Search ..................................... 318/685, 696; 310/49 R; 399/167

[56] References Cited

U.S. PATENT DOCUMENTS

| | | | |
|---|---|---|---|
| 5,111,242 | 5/1992 | Tanimoto et al. | 355/200 |
| 5,374,865 | 12/1994 | Yoshimura et al. | 310/49 R |
| 5,477,120 | 12/1995 | Yoshimura et al. | 318/696 |
| 5,592,261 | 1/1997 | Yoshino | 399/167 |
| 5,659,234 | 8/1997 | Cresens | 318/696 |
| 5,726,510 | 3/1998 | Yoshimura et al. | 310/49 R |

FOREIGN PATENT DOCUMENTS

| | | |
|---|---|---|
| 06149137 | 5/1994 | Japan . |
| 06149138 | 5/1994 | Japan . |
| 06186239 | 7/1994 | Japan . |
| 06236081 | 8/1994 | Japan . |

*Primary Examiner*—Robert E. Nappi
*Assistant Examiner*—Marlon T. Fletcher
*Attorney, Agent, or Firm*—McDermott, Will & Emery

[57] ABSTRACT

In an image forming apparatus which forms images by transferring to a transfer drum a toner image formed on the surface of the photosensitive member directly driven by a stepping motor, the relationship between the stepping angle "θ" (°) of the stepping motor and the rotational speed "N" (rpm) of the photosensitive drum is expressed by the equation $\theta \leqq (360\times N)/(60\times a\times b)$. Where "a" is a natural number, optimally 10, which is less than the initial predetermined tolerance value when the harmonic content of rotational variation generated by the step period of the stepping motor is "1/a", and "b" is the target frequency (Hz) of 100.

5 Claims, 7 Drawing Sheets

Fig. 7 *PRIOR ART*
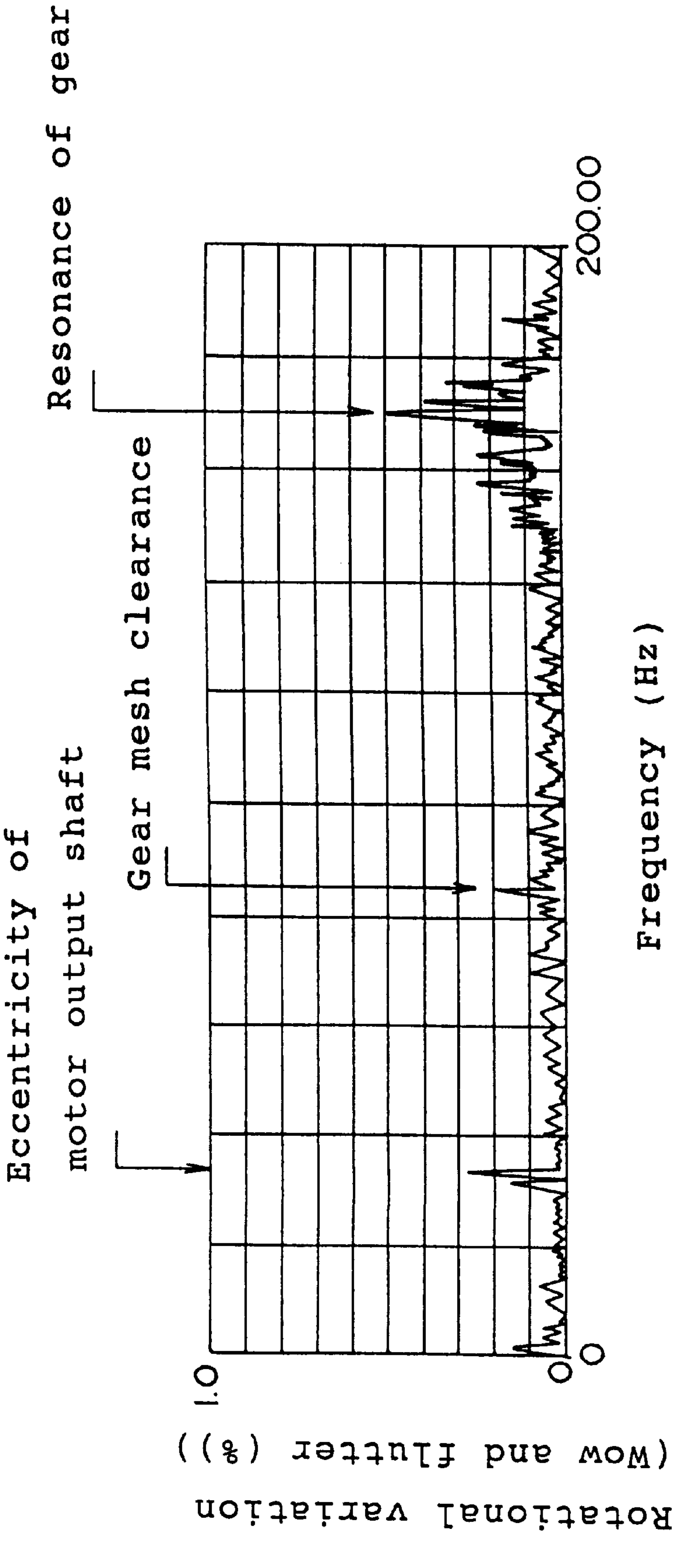

IMAGE FORMING APPARATUS

RELATED APPLICATIONS

This application is based on Application No. HEI 9-360106 filed in Japan, the content of which is hereby incorporated by reference.

BACKGROUND OF THE INVENTION

1. Field of the Invention

The present invention relates to an image forming apparatus, and specifically relates to a drive device for a photosensitive member in an image forming apparatus.

2. Description of the Related Art

In driving the photosensitive member in an image forming apparatus such as a copying machine, printer and the like, it is desirable to eliminate as far as possible the variation of rotation of the photosensitive member which produces deterioration in the quality of the formed image.

The photosensitive member drive mechanism used in conventional image forming apparatuses such as copying machines and the like, for example, drives the rotating shaft of the photosensitive member via a DC motor and a reduction gear. In such drive mechanisms, a large flywheel is mounted on the shaft of the photosensitive member, such that the inertia of the flywheel suppresses irregular rotation of the photosensitive member caused by the rotation fluctuation of the DC motor, the eccentricity of the reduction gear, and the clearance of the meshing portion (gear mesh clearance) of the reduction gears.

Provision of a rotary encoder on the photosensitive member has been proposed to control the rotation of the DC motor by directly detecting irregular rotation of the photosensitive member as well as changes in the surface speed of the photosensitive member.

The photosensitive member has also been driven via direct connection of the photosensitive member shaft and a stepping motor to eliminate the cause of rotational fluctuation caused by the reduction gear. In this instance, a microstep drive is employed to reduce rotational fluctuation generated by the step rise of the stepping motor.

The greatest disadvantage associated with image formation in such image forming apparatuses is the frequency component of rotational fluctuation below 100 Hz, the effects of which are humanly perceptible in a produced image. For example, FIG. 7 shows the rotational variation generated in the drive mechanism which rotates a photosensitive member 101 by a DC motor 102 via a reduction gear 103 shown in FIG. 6. In the drive mechanism of FIG. 6, a rotating shaft 101*a* of the photosensitive member 101 engages an output shaft 103*d* of the reduction gear 103, and the mutual gear ratios of the reduction gears 103*a*, 103*b*, 103*c* are set as integer multiples to fix the rotational variation generated by the gear eccentricity and the gear mesh clearance. The DC motor 102 suppresses rotational variation by rotational control, and rotational variation is further suppressed by providing a flywheel 104 on the output shaft of the reduction gear 103.

Referring now to FIG. 7, it can be understood that the periodic component of rotational variation under 200 Hz is manifested by the resonance of the gear, gear mesh clearance, and eccentricity of the motor output shaft. Among these, the rotational variation caused by the gear mesh clearance and the eccentricity of the motor output shaft are under 100 Hz.

It is difficult to suppress the low frequency components of the rotational variation caused by the eccentricity and the clearance of the gear mesh using a flywheel and the like. These components also are difficult to suppress due to the delay response in the controls even when the rotation of the motor is controlled by direct detection of change in surface speed and rotational variation of the photosensitive member.

On the other hand, it is possible to eliminate rotational variation caused by the gear mesh clearance when the drive is accomplished via a direct connection between the photosensitive member and the stepping motor. Although the stepping motor generates a rapid rotational variation during the step rise, this variation can be reduced by using a microstep drive. A drive by direct connection between the photosensitive member and the stepping motor is therefore desirable from the perspective of reducing rotational variation in the low frequency range.

When a stepping motor is used, however, rotational variation is caused by the torque ripple generated at each step period, and this rotational variation cannot be suppressed by the microstep drive. Since this rotational variation generated at each step period becomes 338 Hz when a typical two-phase stepping motor with a step angle of 1.8° rotates, for example 338 pps as a normal rotation, this rotational variation itself is not manifested as a rotation period irregularity at under 100 Hz. The problem is the harmonic content of this rotational variation. In normal oscillation, a harmonic content is generated at n times and 1/n times (n: a natural number) one oscillation component.

That is, the harmonic content of the 338 Hz rotational variation is manifested at 169 Hz at ½ component, 112.7 Hz at ⅓ component, 84.5 Hz at ¼ component, 67.6 Hz at ⅕ component, and 56.3 Hz at ⅙ component. These harmonic contents of under 100 HZ still affect the image despite the decrease in amplitude of the base rotational variation component as the denominator increases.

Furthermore, when driving via direct connection between the photosensitive member and the stepping motor, it is necessary to reduce the stepping speed to the previously mentioned 338 pps. When the stepping speed is reduced in this way, rotational variation readily occurs, and the scale of the motor must be increased due to the reduced torque. Since there motor torque decreases when a microstep drive is used, the motor must be enlarged to obtain torque.

SUMMARY OF THE INVENTION

An object of the present invention is to suppress the oscillation component under 100 Hz which affects the image so as to provide stable rotation and high torque while maintaining the size of the motor as small as possible in a construction wherein a photosensitive member is rotated via direct connection between the photosensitive member and a stepping motor.

In order to attain these objects, one aspect of the present invention, in an image forming apparatus for forming images by transferring to a transfer member a toner image formed on the surface of a photosensitive member directed driven by a stepping motor, is the relationship between the stepping angle "θ" (°) of the stepping motor and the rotation speed "N" (rpm) of the photosensitive member is expressed by the equation below.

$$\theta \leqq (360 \times N)/(60 \times a \times b)$$

Where "a" is a natural number in which the harmonic content (1/a) of rotational variation generated by the step period of the stepping motor becomes less than the initial predetermined tolerance value. That is, the harmonic content of rotational variation decreases as the denominator of degree increases so as to be less than a predetermined tolerance value, and the value of the denominator which is less than an initial tolerance value at this time is designated "a". Although the value of "a" is determined for each image forming apparatus, it is optimally 10. Furthermore, "b" is the target frequency (Hz), e.g., 100 Hz is optimum when selecting a critical frequency which does not affect the image. Photosensitive member rotation speed N normally is an optimum speed which does not adversely affect image formation, and is selected depending on the construction of the image forming apparatus.

The stepping motor desirably is a full-step drive type.

These and other objects, advantages and features of the invention will become apparent from the following description thereof taken in conjunction with the accompanying drawings, which illustrate specific embodiments of the invention.

BRIEF DESCRIPTION OF THE DRAWING

FIG. 7 shows the relationship between the frequency and the rotational variation in the photosensitive member drive mechanism of FIG. 6.

DETAILED DESCRIPTION OF THE PREFERRED EMBODIMENTS

Figure 1:
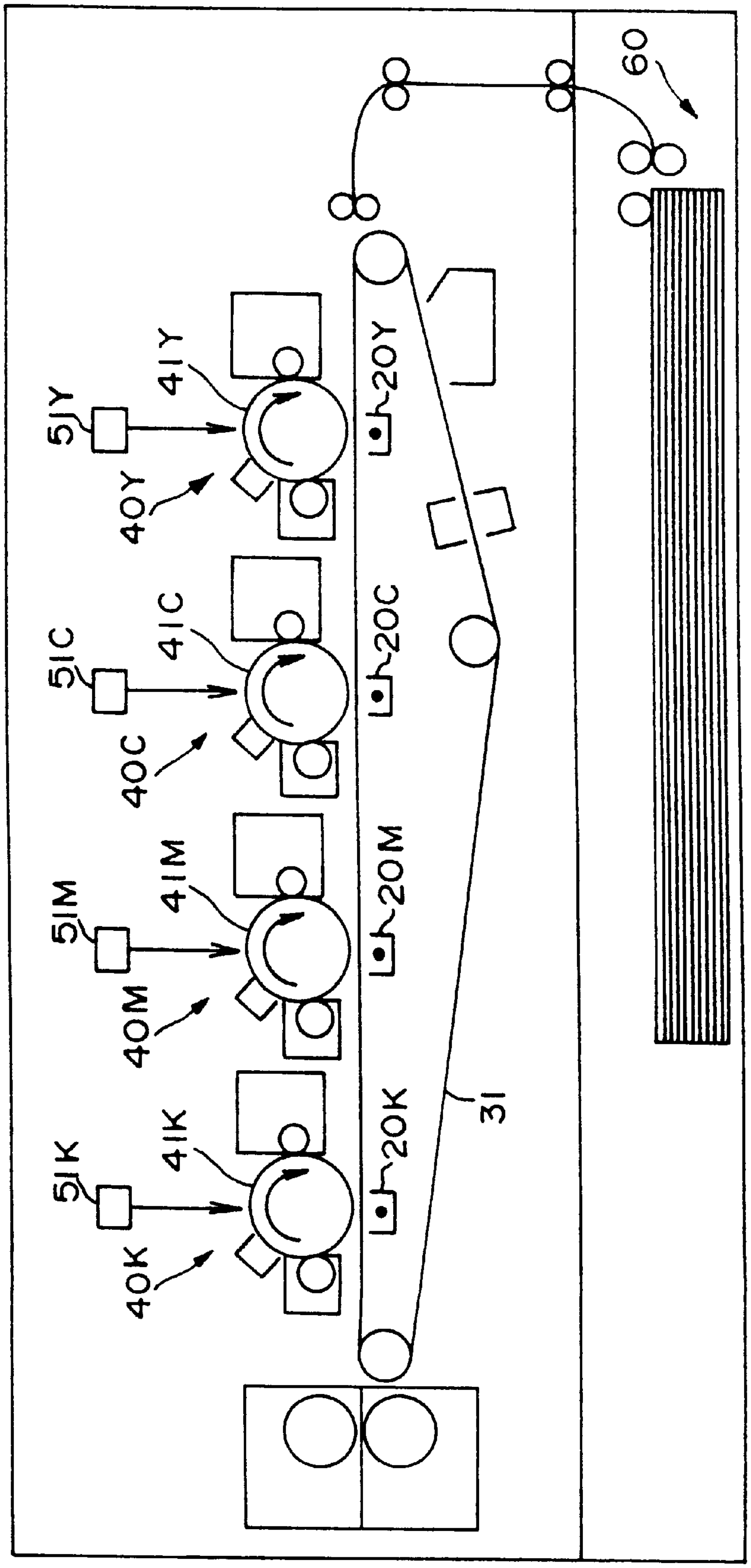
FIG. 1 is a brief section view of the image forming apparatus of an embodiment of the invention.

The preferred embodiments of the present invention are described hereinafter with reference to the accompanying drawings. FIG. 1 illustrates a full color image forming apparatus of the so-called tandem type provided with image forming units for each color, wherein each of the image forming units form a toner image, and the images are transferred in multiple stages onto a recording sheet supported on a transport belt. This tandem-type image forming apparatus employs a horizontal transport belt 31, and is provided with images forming units 40Y, 40M, 40C, and 40K arranged along the lengthwise direction of the transport belt 31. As a recording sheet is fed from a paper cassette 60 via the transport belt 31, the toner image of each color component formed by each image forming unit is transferred and overlaid on the recording sheet to form a color image.

In this image forming apparatus, Each color component Y (yellow), M (magenta), C (cyan), and K (black) is analyzed by the necessary image processing of image signals of the image to be formed transmitted from an image reader or external device not shown in the drawing. Then, the laser beams of the corresponding color components emitted by laser diodes 51Y–51K based on each color component signal are directed to image forming units 40Y–40K.

Image forming units 40Y–40K are centrally provided with photosensitive drums 41Y–41K, around the periphery of which are arranged chargers and developing devices and the like, and the surface of the photosensitive drum which rotates in the arrow direction is optically exposed by the laser beam emitted from laser diodes 51Y–51K, respectively, and the electrostatic latent image formed by the exposure is developed by the developing device and rendered visible as a toner image. The developing device of each unit supplies toner Y, M, C, K corresponding to the modulated color component as developer to the photosensitive drum.

Chargers 20Y–20K are provided at a position directly below the photosensitive drum, through the transport belt, of each image forming unit 40Y~40K so as to transfer the toner image on the surface of the photosensitive drum onto the recording sheet supported on the transport belt 31. The recording sheet bearing the transferred image is transported to the position of a fixing roller via the transport belt 31, the image is fixed to the recording sheet, and thereafter the recording sheet is ejected to a discharge tray.

Figure 2:
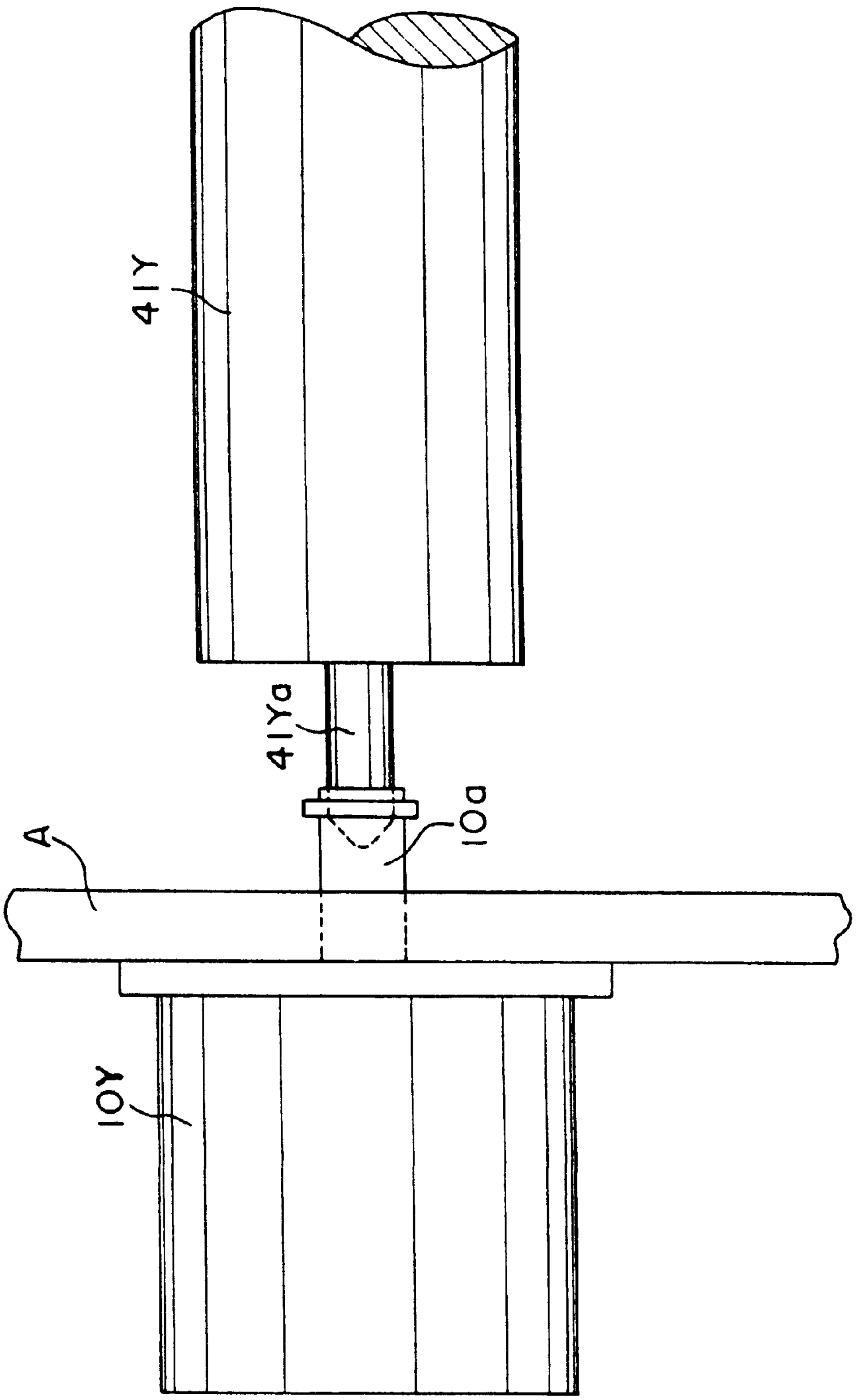
FIG. 2 is an elevation view of the photosensitive member drive mechanism of the present embodiment.

FIG. 2 shows the drive mechanism of the photosensitive drum 41Y. The drive mechanisms of the other photosensitive drums 41M–41K are identical. The rotation shaft 41Ya of the photosensitive drum 41Y shown in the drawing is directly connected to the drive shaft 10*a* of the stepping motor 10Y fixedly mounted in the apparatus, and the photosensitive drum 41Y is directly driven by the stepping motor 10Y. The stepping motor 10Y is a 5-phase step motor, and the rotation speed of the photosensitive drum is set at 32.1 rpm.

Figure 3:
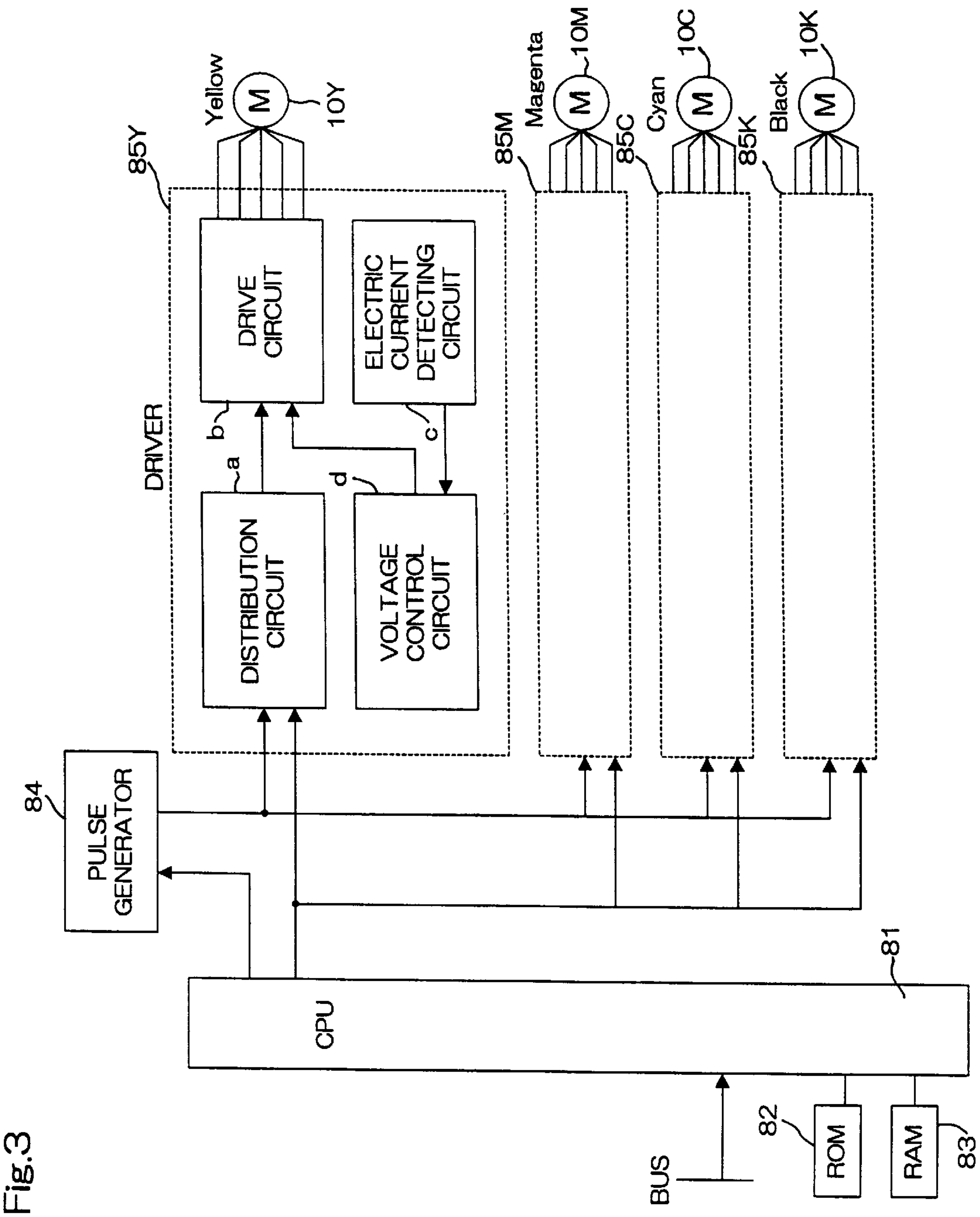
FIG. 3 is a block diagram showing the hardware construction of the control unit of the stepping motor.

FIG. 3 is a block diagram of the controller of the stepping motors 10Y–10K which drive the photosensitive drums 41Y–41K. This controller comprises a CPU 81 for controlling the entire unit, a ROM82 for storing programs specifying the operating sequence of CPU 81, a RAM 83 providing the work area for CPU 81, a pulse generating circuit 84 for generating a standard pulse, and drive circuits 85Y–85K for generating drive pulses for the four 5-phase stepping motors 10Y–10K. The controller of this construction provides a full-step drive for the four stepping motors 10Y–10K via 5-phase excitation.

The CPU 81 controls the ON/OFF switching of each of the drive circuits 85Y–85K, and transmits pulse rate data to a pulse generating circuit 84 which generates the excitation pulses for phase change. The pulse generating circuit 84 generates a clock pulse corresponding to the transmitted pulse rate, and transmits the clock pulse to each drive circuit 85Y–85K. The clock pulse is transmitted from a single pulse generating circuit 84 to each of the drive circuits 85Y–85K to achieve identical rotation variation of the motors relative to the clock change.

In each of the drive circuits 85Y–85K, a distribution circuit ‘a’ generates a timing signal by distributing the clock pulses transmitted from pulse generating circuit 84 into 5-phase. The drive circuit ‘b’ switches the ON/OFF of the current flowing to each phase coil of the stepping motors using a MOSFET in accordance with the timing signals transmitted from the distribution circuit ‘a’. The current value flowing in each phase is detected by current detection circuit ‘c’, and a voltage control circuit ‘d’ controls the voltage supplied to the stepping motors in accordance with the detection value detected by the current detection circuit ‘c’.

The selection of the stepping angle of the previously described stepping motor 10Y–10K is described below. The stepping angle of the stepping motor 10Y–10K is selected such that the image quality is not affected by the harmonic content of the rotation variation caused by the torque ripple at each step.

First, when the stepping angle is set at “θ ” (°) and the number of rotation of the photosensitive drum is set at “N” (rpm), the frequency “A” producing rotational variation at each step is expressed by the equation below.

$$A=(360\times N)/(60\times\theta) \quad \text{(Hz)}$$

The lowest frequency within the harmonic content relative to frequency “A” is expressed by the equation below.

$$A^{*}=A/m \quad \text{(Hz)}$$

(where m=a natural number)

Figure 4:
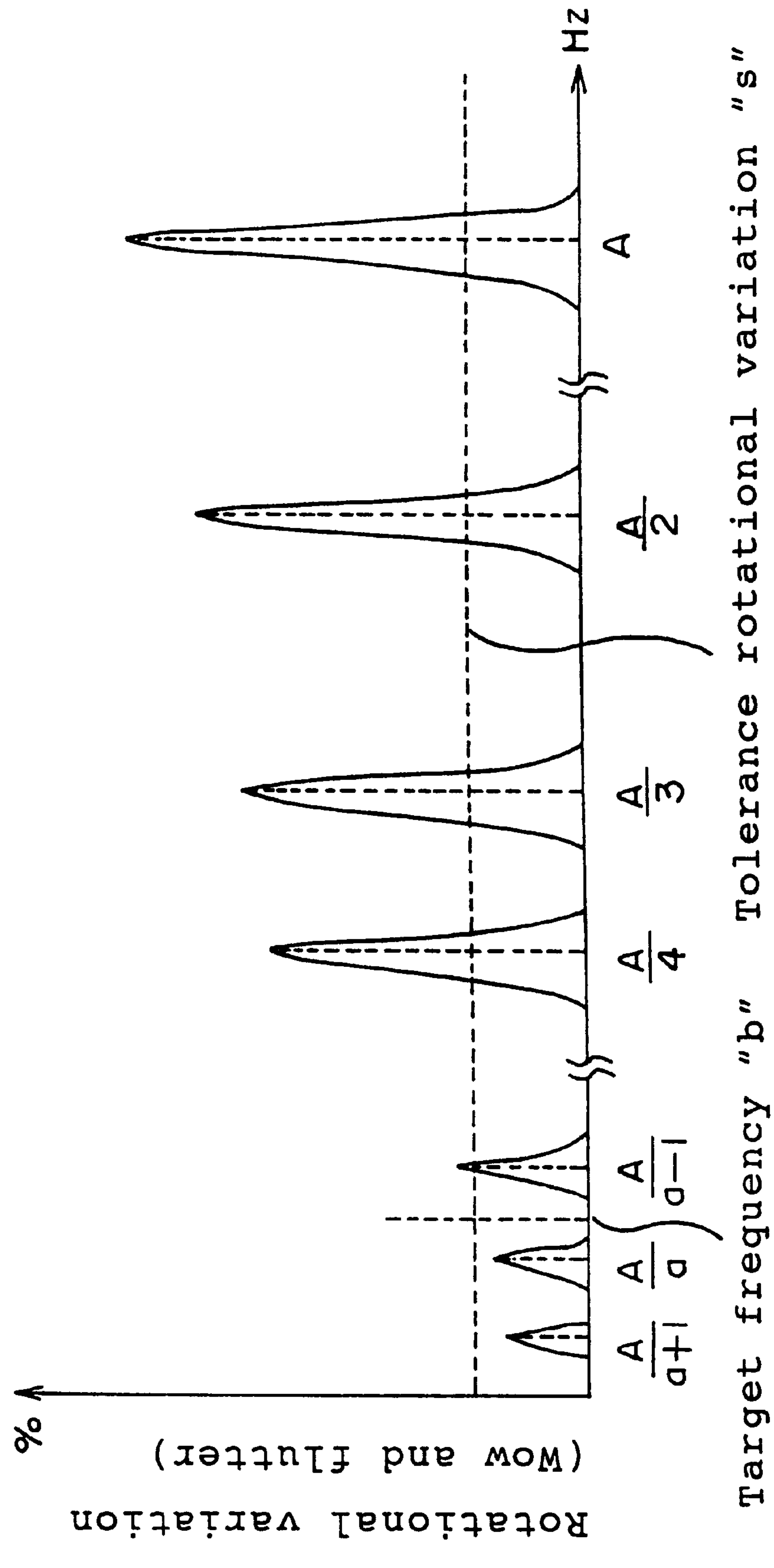
FIG. 4 conceptually shows the relationship among the step period of the stepping motor, the harmonic content, and the rotational variation.

Since the harmonic content "A*" becomes attenuated as the value of "m" increases, the relationship between the harmonic content of "A" and "A*" is shown in FIG. 4. The attenuation rate changes in accordance with the rigidity of the photosensitive member shaft and the copying machine body, the harmonic content decreases as the value of "m" increases, so as to be less than the value of the tolerance rotational variation. In this instance, when the tolerance rotational variation "s" is 0.3%, the value of "m", which is less than the tolerance rotational variation "s", is the inherent value of the copying machine. The value of "m", which is less than the initial tolerance rotational variation "s", is designated "a".

The critical value of the frequency affecting an image and which is just humanly perceptible is 100 Hz, and this value is designated the target frequency "b". The stepping angle "θ" of the stepping motor is set so that the rotational variation at this target frequency "b" is less than the tolerance rotational variation "s". That is, the harmonic content having the previously mentioned denominator "a" may be less than the target frequency "b". When expressed as an equation the following is obtained:

$$(A/a)=(360\times N)/(60\times\Theta\times a)\leqq b.$$

Specific numerical values for substitution in the equation are N=32.1 (rpm), b=100 (Hz), and a=10. The value a=10 is a value determined experimentally using copying machines of typical construction. When solving for "θ", it is found that θ≦0.1926°. The value of "θ" may be set, for example, at 0.16070.

Figure 5:
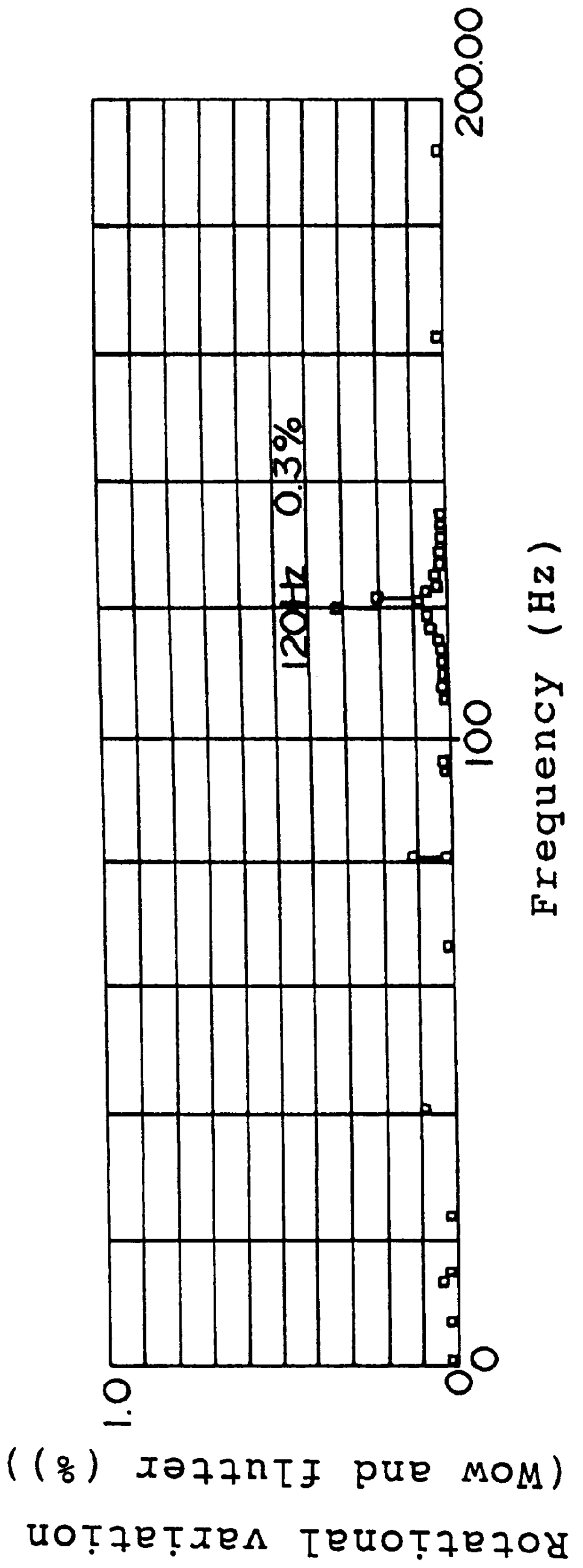
FIG. 5 shows the relationship between the frequency and the rotational variation in the photosensitive member drive mechanism of the present embodiment.
Figure 6:
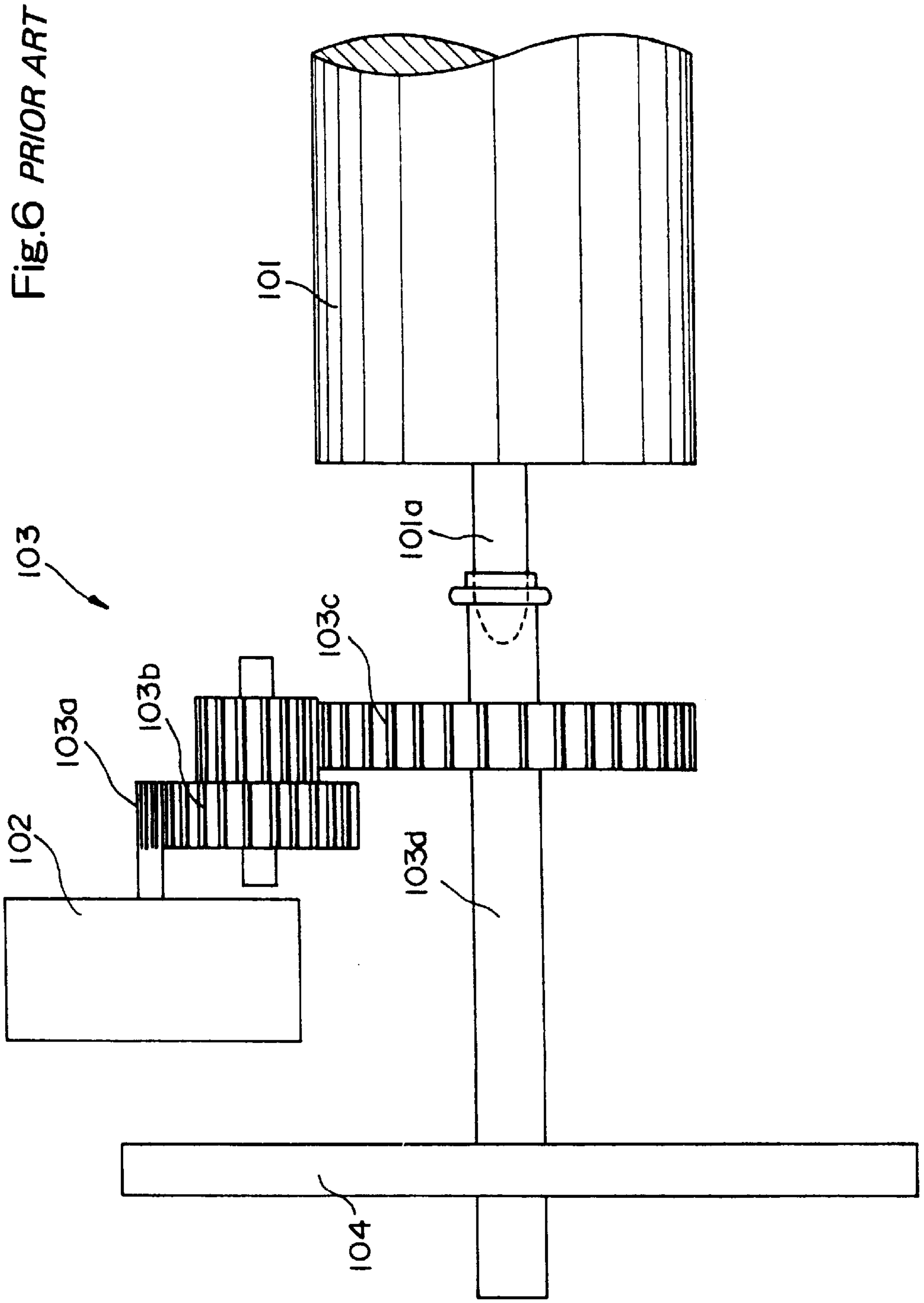
Fig.6 PRIOR ART
FIG. 6 is an elevation view of an example of a photosensitive member drive mechanism.

FIG. 5 shows the state of rotational variation when the stepping angle is 0.1607° and the drum is rotated at 32.1 (rpm). As can be understood from the drawing, although a peak rotational variation of 0.3% is generated at about 120 Hz, essentially no rotational variation is generated at less than 100 Hz.

When the photosensitive drum is rotated, for example, at 32.1 (rpm), a pulse is generated at 1198.5 (pps), due to the small stepping angle of the stepping motor, and the step speed is sufficiently increased so as to stabilize rotation and produce torque even if the number of rotations is reduced. When the amount of the step is small, the amount of movement of the photosensitive drum surface can be equal to or less than the distance between pixels of the image resolution, and since there is no need to consider rotational variation in the step rise, there is no disadvantage to using this full step drive rather than a microstep drive. Accordingly, torque is assured. In this way sufficient torque and rotational stability are obtained even with a compact stepping motor, and, therefore, the overall image forming apparatus may be made more compact, which reduces cost.

The lower limit of the stepping angle of the stepping motor described above is considered below. Reducing the stepping angle of the stepping motor requires very fine pitch of the gear teeth formed on the stator and rotator, and the outer diameter of the motor must be as small as possible. For example, when the stepping angle is set at 0.1607 as mentioned above, the limit of the outer diameter of the motor is 85 mm from a manufacturing technical standpoint.

The pitch of the gear teeth may increase as the circumferential length of the motor is increased, and since the circumferential length is proportional to the outer diameter of the motor, when the outer diameter of the motor allowed under design tolerances of the device is designated "L" (mm; L>85), the stepping angle lower limit "θ0" (°) can be expressed by the equation below.

$$\theta o=0.1607\times(85/L)$$

For example, when L=140 (mm) is substituted in the equation, the motor outer diameter lower limit "θ0" is θ0=0.09760.

Although the present invention has been described by way of example of a so-called tandem-type image forming apparatus in the present embodiment, the present invention may be variously adapted insofar as the image forming apparatus forms images using a rotating photosensitive member.

In the previously described image forming apparatus, the harmonic content of the rotational variation generated by the step period of the stepping motor is less than the tolerance value at the target frequency, and affects to the image due to rotational variation can be suppressed under the target frequency.

When the stepping motor is driven by full-step drive, a large torque is produced in the state wherein rotational variation generated by the step period of the stepping motor is reduced, such that a smaller motor can be used.

By setting the value of the previously mentioned value "b", at 100 Hz, it is possible to suppress rotational variation to under 100 Hz at which affects on the formed images are humanly perceptible, thereby producing images of excellent quality.

By setting the value of the previously mentioned value "a" at 10, the harmonic content of the rotational variation generated by the step period of the stepping motor can be set below the tolerance value in a range below the target frequency in an image forming apparatus of typical construction such as a copying machine and the like.

Although in the previously described embodiment, the values a=10 and b=100 were provided as examples, these values may be modified in the present invention insofar as such modification is within a range which does not substantially depart from these values.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. In an image forming apparatus for forming images by a photosensitive member directed driven by a stepping motor, wherein:

a relationship between a stepping angle θ (°) of the stepping motor and a rotation speed N (rpm) of the photosensitive member is expressed by the equation of;

$$\theta\leqq(360\times N)/(60\times a\times b)$$

where a is a natural number 10 in which the harmonic content 1/a of rotational variation generated by the step period of the stepping motor becomes less than a predetermined tolerance value, and b is the target frequency 100 Hz.

2. The image forming apparatus according to claim 1, wherein said stepping motor is a full-step drive type.

3. The image forming apparatus according to claim 1, wherein said apparatus comprises a plurality of photosensitive members and stepping motors.

4. The image forming apparatus according to claim 3 further comprising a pulse generator which generates a pulse, and wherein said stepping motors are driven based on the pulse generated from the same pulse generator.

5. The image forming apparatus according to claim 3, wherein said image forming apparatus forms a full color image by means of said photosensitive members.

* * * * *